United States Patent
Mutschler et al.

(10) Patent No.: US 8,380,407 B2
(45) Date of Patent: Feb. 19, 2013

(54) METHOD FOR CONTROLLING A HYDROSTATIC DRIVE

(75) Inventors: Steffen Mutschler, Neu-Ulm (DE);
Markus Weber, Kronach (DE);
Matthias Mueller, Langenau (DE)

(73) Assignee: Robert Bosch GmbH, Stuttgart (DE)

( * ) Notice: Subject to any disclaimer, the term of this patent is extended or adjusted under 35 U.S.C. 154(b) by 462 days.

(21) Appl. No.: 12/745,569

(22) PCT Filed: Dec. 22, 2008

(86) PCT No.: PCT/EP2008/011027
§ 371 (c)(1),
(2), (4) Date: Jun. 1, 2010

(87) PCT Pub. No.: WO2009/083222
PCT Pub. Date: Jul. 9, 2009

(65) Prior Publication Data
US 2010/0324791 A1 Dec. 23, 2010

(30) Foreign Application Priority Data
Dec. 28, 2007 (DE) .................. 10 2007 062 888

(51) Int. Cl.
*G06F 7/00* (2006.01)
(52) U.S. Cl. ........................................ 701/58
(58) Field of Classification Search ............ 701/58
See application file for complete search history.

(56) References Cited

U.S. PATENT DOCUMENTS

| | | | | |
|---|---|---|---|---|
| 5,939,948 A | * | 8/1999 | Nakazawa | 331/11 |
| 6,480,774 B1 | * | 11/2002 | Snow et al. | 701/51 |
| 7,386,978 B2 | | 6/2008 | Ivantysynova | |
| 2002/0087244 A1 | | 7/2002 | Dix et al. | |
| 2010/0121543 A1 | * | 5/2010 | Landes et al. | 701/54 |
| 2011/0190971 A1 | * | 8/2011 | Severinsky et al. | 701/22 |

FOREIGN PATENT DOCUMENTS

| | | |
|---|---|---|
| DE | 103 07 190 | 9/2004 |
| EP | 1 967 745 | 9/2008 |
| WO | 2007/074670 | 7/2007 |

* cited by examiner

*Primary Examiner* — Hussein A. Elchanti
(74) *Attorney, Agent, or Firm* — Michael J. Striker

(57) ABSTRACT

The invention relates to a method for controlling a hydrostatic drive having at least one first hydraulic consumer and one second hydraulic consumer. The two hydraulic consumers are driven by a common drive machine. First of all, a first power requirement of the first hydraulic consumer is determined (20). Proceeding from the determined first power requirement, the free power which is available as a result of the common drive machine is determined (21). This available free power of the common drive machine is scaled onto a possible actuating path of a control transmitter for the working hydraulics (22). A position of the control transmitter for actuating the second hydraulic consumer is determined (23) and a power requirement is assigned on the basis of the scaled available free power. An operating point of the common drive machine is fixed from the first power requirement and the second power requirement (24).

5 Claims, 2 Drawing Sheets

METHOD FOR CONTROLLING A HYDROSTATIC DRIVE

The invention relates to a method for controlling a hydrostatic drive comprising at least one first hydraulic consumer and a second hydraulic consumer which are driven by a common drive machine.

A hydrostatic drive is known from DE 103 07 190 A1. The hydraulic system of the mobile working machine described therein includes a travel drive and at least one working hydraulic system. The travel drive and the working hydraulic system are hydraulic consumers that are driven by a common working machine. The common working machine is designed as a diesel internal combustion engine. In operating the mobile working machine, the drive power provided by the diesel internal combustion engine must be divided between the travel drive and the working hydraulics. To this end, the power consumed by the respective hydrostatic pumps, which are connected to the diesel internal combustion engine, is determined for the corresponding accelerator pedal position or the position of a joystick used to operate the working hydraulics. A power to be provided by the internal combustion engine is determined on the basis of the power to be consumed, which is represented by the accelerator pedal position or the joystick position, by the hydraulic consumers, that is, the hydrostatic pumps that are connected. The internal combustion engine is then set to an operating point at which it is capable of fulfilling the power demand.

The system described above has the disadvantage that the rated output of the diesel internal combustion engine must be selected such that the diesel internal combustion engine is capable of meeting the power demand when the accelerator pedal is depressed completely and when the joystick is in the end position. However, if this approach is not taken, in order to prevent overdimensioning the diesel internal combustion engine unnecessarily, the problem arises that the power demand of the working hydraulics cannot be met e.g. when the demand from the travel drive is high. The power component that is available to the working hydraulics is too small, and moving the joystick in the direction of providing more power to the working hydraulics is perceived by the user as free travel.

The object of the invention, therefore, is to create an improved control system for a hydrostatic drive, in which, in particular, feedback can be provided about the power components that are available to the working hydraulics.

The object is solved by the method having the features of claim 1.

In the method, according to the invention, for controlling a drive that includes a common drive machine and at least one first hydraulic consumer and a second hydraulic consumer, a first power demand by the first hydraulic consumer is determined first. This will usually be the travel drive of a mobile working machine. When this first power demand, which must be met by the common drive machine, is known, the available free power of the common drive machine can be determined. The available free power is the difference between a power that can be output by the drive machine, and the first power demand that is ascertained. This available free power of the common working machine is scaled onto a possible actuating path of a control transmitter e.g. a joystick. The power that is actually available is therefore scaled between a no-load position of the control transmitter and the maximum deflection of the control transmitter, which is intended for use e.g. to actuate the working hydraulic system. As a result, movement of the control transmitter is always converted to a change in the power input of the second hydraulic consumer. After the available free power has been scaled, a second power demand is assigned to an ascertained position of the control transmitter. The operating point of the common working machine is then defined on the basis of this second power demand and the first power demand that was ascertained. The common working machine can then always be set to a favorable operating point on the basis of the actual power demand, and, since the amount of free power that is theoretically still available has been scaled, the operator is provided with feedback about the level of the power reserves that are available for the working hydraulic system.

Advantageous developments of the method according to the invention are described in the dependent claims.

It is advantageous, in particular, to define a maximum value for the first power demand. By defining such a maximum value, it is ensured that all of the drive power of the common working machine cannot be used for the travel drive. A minimum level of power is therefore always available for further hydraulic consumers that are connected, that is, in particular, the working hydraulic system of a mobile working machine.

Furthermore, it is advantageous to calculate the available free power on the basis of the difference between the absolute maximum power (rated output) of the common working machine and the first power demand that was ascertained.

As an alternative, the free power of the common drive machine that is available at a particular operating point that was set could also be determined. Furthermore, a gear ratio of the hydrostatic travel drive is determined on the basis of the position of the drive-command input device. It is therefore possible to drive the mobile working machine as if it were an automobile and, in particular, operation by an operator is greatly simplified. The method according to the invention also makes it possible, above all, to eliminate the "inch pedal" which is customarily used to flexibly adjust the power components between the working hydraulic system and the travel drive, although user handling is required.

An advantageous embodiment is depicted in the drawing and is described in detail in the description that follows. In the drawing.

Figure 1:
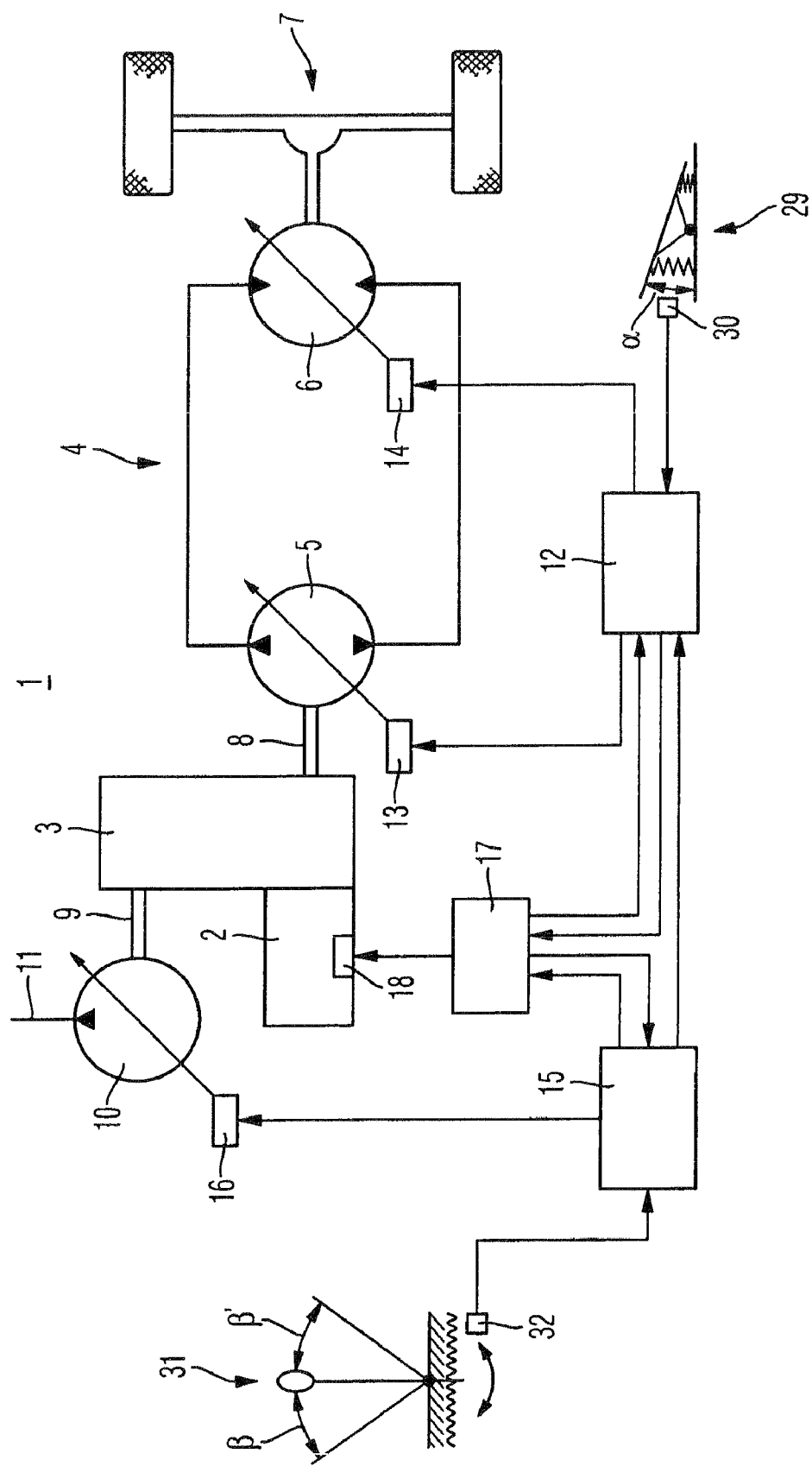
FIG. 1 shows a schematic depiction of a hydraulic system of a mobile working machine.

FIG. 1 shows a greatly simplified depiction of a hydrostatic drive (1) of a mobile working machine such as an excavator. Hydrostatic drive 1 includes a diesel internal combustion engine 2 which is used as a common drive machine. Diesel internal combustion engine 2 is connected to a transfer case 3 which is used to distribute the torque generated by diesel internal combustion engine 2 to a plurality of consumers.

A hydrostatic transmission 4 of the travel drive of the mobile working machine is connected to transfer case 3, as the first hydraulic consumer. Hydrostatic transmission 4 includes a variable capacity pump 5 and a variable displacement motor 6. Variable displacement motor 6 is connected via an output shaft to a driven axle of the mobile working machine. The connection to only one driven axle is intended to be an example. Another drive concept such as all-wheel drive can be implemented just as easily, of course.

Transfer case 3 is connected to variable capacity pump 5 by a first drive shaft 8, and it is connected to a further variable capacity pump 10 by a second drive shaft 9. Further variable capacity pump 10 is connected by a supply line 11 to a working hydraulic system e.g. a reciprocating cylinder, and forms a second hydraulic consumer.

Diesel internal combustion engine 2 therefore drives a first hydraulic consumer in the form of first variable capacity pump 5, and a second hydraulic consumer in the form of further variable capacity pump 10 of the working hydraulic system.

The displacements of variable capacity pump 5 and variable displacement motor 6 of hydrostatic transmission 4 are adjustable, and the two are preferably designed as a swash plate machines. An electronic control unit, which is referred to as travel-drive control 12 below, is provided for adjusting the displacement. Travel-drive control 12 generates a first control signal for adjusting the volumetric displacement of variable capacity pump 5, and a second control signal for adjusting the intake volume of hydraulic motor 6. The first control signal is transmitted to a first adjusting device 13, and the second control signal is transmitted to a second adjusting device 14. Adjusting devices 13, 14 interact with the respective adjusting mechanisms of variable capacity pump 5 and hydraulic motor 6 and thereby adjust them to a desired gear ratio of hydrostatic transmission 4 in accordance with the control signal.

A further electronic control unit is referred to below as working hydraulic system control 15. Working hydraulic system control 15 is connected by a signal line to a third adjusting device 16. Third adjusting device 16 adjusts the volumetric displacement of further variable capacity pump 10 and thereby regulates the power input of further variable capacity pump 10.

A further control device, i.e. diesel control device 17, is provided for setting an operating point of diesel internal combustion engine 2. Diesel control device 17 specifies an operating point and thereby controls a setpoint speed of diesel internal combustion engine 2. To this end, a control signal is transmitted to fuel injection system 18 of diesel internal combustion engine 2. Diesel control device 17 is connected to working hydraulic system control 15 and travel-drive control 12.

A signal from an accelerator pedal 19 is transmitted to travel-drive control 12 in order to determine a first power demand. Accelerator pedal 19 is intended to merely represent an example. A drive lever or another drive-command input device could be provided just as easily. In the embodiment shown, accelerator pedal 29 can be swiveled out of a neutral position and into two opposing directions to implement an automotive driving operation. Particular angle α which results, and which characterizes the position of accelerator pedal 29, is determined using a position detector 30, and a position signal is transmitted to travel-drive control 12. On the basis of this position signal, travel-drive control 12 ascertains a first power demand, and transmits this power demand to diesel control device 17. On the basis of the first power demand that is ascertained, diesel control device 17 determines the available free power of diesel internal combustion engine 2. At the most, this available free power is as great as the difference between the absolute maximum power of the diesel internal combustion engine that it can produce at the nominal speed, and the first power demand that is ascertained. The information about the available free power is transmitted by diesel control device 17 to working hydraulics control 15.

A control transmitter, which is realized as an operating lever 31 in the embodiment shown, controls the power input of further variable capacity pump 10. Operating lever 31 can be displaced from its neutral position shown in FIG. 1, into two directions, to an end position in each case. The travel distances to the first end position and to the opposite, second end position can differ, and they are labelled in FIG. 1 as angles β and β'. The particular position of operating lever 21 is detected by a further position sensor 32, and the position signal is supplied to working hydraulic system control 15. Working hydraulic system control 15 scales the power available from diesel internal combustion engine 2 onto displacement travel β of operating lever 21 between its neutral position and a respective end position. It is therefore ensured that a power reserve of diese internal combustion engine 2 is available at every position ascertained by further position sensor 32 in the direction toward the maximum deflection of operating lever 21, to ensure that the working hydraulic system or further variable capacity pump 10 that supplies the working hydraulic system can respond.

As indicated by the direct connection between drive hydraulic system control 15 and travel-drive control 12, a maximum value for the power demand of the travel drive can also be defined by working hydraulic system control 15. This maximum power demand that the travel drive can then utilize can be parametrized. To this end, working hydraulics system control 15 sets an appropriate limit value e.g. it is stored in an integrated memory. The maximum value for travel-drive control 12 therefore defines an upper limit for the power to be demanded of diesel internal combustion engine 2 by the travel drive, thereby ensuring that a minimum output of diesel internal combustion engine 2 is always available for the working hydraulic system.

Figure 2:
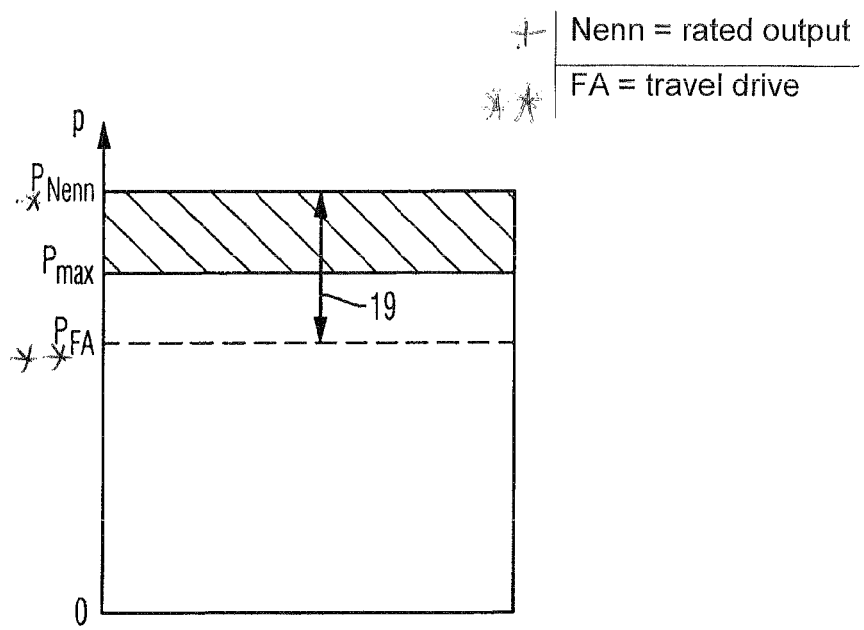
FIG. 2 shows a schematic depiction of the power distribution between a working hydraulic system and a travel drive.

This is explained once more below with reference to FIG. 2. FIG. 2 shows rated output $P_{Nenn}$ of diesel internal combustion engine 2. A maximum value, $P_{max}$, is also plotted. The travel drive can only be set in a range between zero and $P_{max}$. If the first ascertained power demand of the travel drive is less than $P_{max}$, and is $P_{FA}$ for example, then free power is available and amounts to the difference between $P_{Nenn}$ and $P_{FA}$. It is indicated in FIG. 2 using arrow 19. Available free power 19 is scaled onto displacement travel β of operating lever 31. In the simplest case, the scaling is linear.

Figure 3:
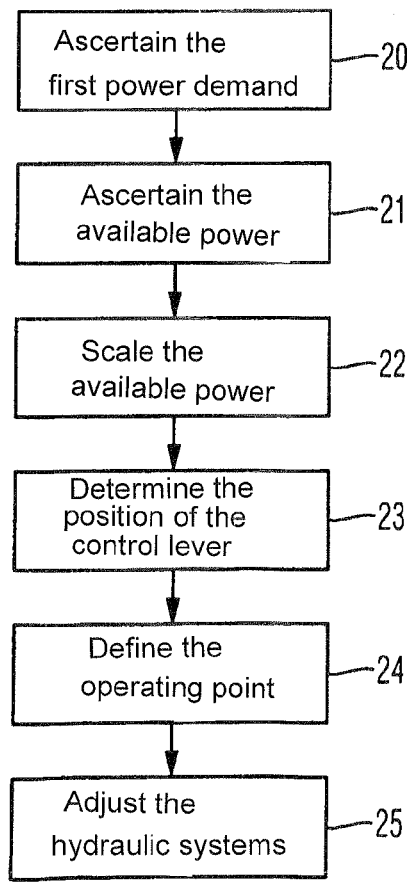
FIG. 3 shows a simplified depiction of the procedure for controlling a hydrostatic drive.

The method according to the invention is explained in simplified manner using FIG. 3. In the first step, the first power demand is determined, in step 20. In the embodiment described, in which the first hydraulic consumer is hydrostatic transmission 4, the first power demand is the power demanded by the travel drive. It is determined on the basis of accelerator pedal position α. The available free power is determined in step 21, with consideration for the first power demand. To this end, the first power demand is transmitted from the travel-drive control to diesel control device 17. The latter determines the available free power on the basis of the power demand and the maximum power of diesel internal combustion engine 2, and communicates it to working hydraulic system control 15. Working hydraulic system control 15 scales the available free power determined in step 21 onto possible displacement travel β of operating lever 21. Next, in step 23, the position of operating lever 21 is determined using further position sensor 22. A second power demand of the working hydraulics system is assigned to this ascertained position on the basis of the scaled available free power. An operating point for diesel internal combustion engine 2 is defined on the basis of the ascertained first power demand and the ascertained second power demand. A program map of diesel internal combustion engine 2, which is stored in diesel control device 17, is preferably used to define the operating point. With consideration for optimized consumption, an operating point is selected that is adequate for realizing the total power demand that was ascertained.

When the power demand changes, due either to the travel drive or the working hydraulic system, a new operating point is defined accordingly. If the power demand increases, this typically results in an increase in the speed of diesel internal combustion engine 2. On the basis of the operating point that is defined, diesel control device 17 detemines a setpoint speed for diesel internal combustion engine 2, and a corresponding control signal is supplied to fuel injection system 18 of diesel internal combustion engine 2. Fuel injection system 18 adjusts the diesel internal combustion engine to this setpoint speed.

Furthermore, travel-drive control 12 determines the gear ratio of the hydrostatic transmission, and a volumetric displacement of variable capacity pump 5 and an intake volume of hydraulic motor 6 is set by adjusting devices 13 and 14. Furthermore, working hydraulic system control 15 determines a volumetric displacement of variable capacity pump 10, and it is set using adjusting device 16.

Variable capacity pumps 5, 10 or hydraulic motor 6 are adjusted using adjusting devices 13, 14 and 16 in a known manner e.g. using electroproportional adjusting devices.

The embodiment shows, in a simplified form, the method according to the invention for a hydrostatic drive 1 that includes a travel drive as the first hydraulic consumer, and a further variable capacity pump 10 as the second hydraulic consumer. It is readily obvious, however, that further power consumers can be disposed on transfer case 3. They are then accounted for accordingly by further control devices that substantially correspond to working hydraulic system control device 15. These additional power demands are then determined individually and are supplied to diesel control device 17. Diesel control device 17 likewise accounts for the further power demands.

The present invention is not limited to the embodiment shown. In particular, individual features of the embodiment, which was explained in detail, may be advantageously combined with one another.

What is claimed is:

1. A method for controlling a hydrostatic drive comprising at least one first hydraulic consumer (5) and a second hydraulic consumer (10) which are driven by a common drive machine (2), the method comprising steps of:
    determining first power demand (20) of the first hydraulic consumer (5) using a travel-drive control (12),
    determining a free power (21) that is available from the common drive machine (2) using a diesel control device (17),
    scaling the free power (22) that is available from the common drive machine (21) onto an actuating path ($\beta$) of a control transmitter (31) using a working hydraulic system (15),
    determining a position (23) of a control transmitter (31) for actuating the second hydraulic consumer (10) using a position sensor (22),
    assigning a second power demand (23) to the ascertained position of the control transmitter (31) based on the scaled available free power, and
    determining an operating point (24) of the common drive machine (2) with consideration for the first and second power demands using the diesel control device (17).

2. The method according to claim 1, further comprising defining a maximum value ($P_{max}$) for the first power demand ($P_{FA}$).

3. The method according to claim 1, further comprising calculating the available free power (19) on the basis of the difference between an absolute maximum power ($P_{Nenn}$) of the common drive machine (2) and the ascertained first power demand ($P_{FA}$).

4. The method according to claim 1, further comprising ascertaining a position ($\alpha$) of a drive-command input device (29) to determine the first power demand ($P_{FA}$).

5. The method according to claim 4, further comprising determining a gear ratio of a hydrostatic transmission (4) of a travel drive on the basis of the position ($\alpha$) of the drive-command input device (29).

* * * * *